(12) United States Patent
Zhao et al.

(10) Patent No.: US 6,645,563 B2
(45) Date of Patent: Nov. 11, 2003

(54) METHOD OF COATING A SHAPED MINERAL ARTICLE

(75) Inventors: Cheng-Le Zhao, Schwetzingen (DE); Manfred Schwartz, Frankenthal (DE); Bertold Bechert, Grünstadt (DE); Harm Wiese, Heidelberg (DE); Wolfgang Hümmer, Birkenheide (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/730,593

(22) Filed: Dec. 7, 2000

(65) Prior Publication Data

US 2001/0000232 A1 Apr. 12, 2001

Related U.S. Application Data

(63) Continuation of application No. 09/188,326, filed on Nov. 9, 1998, now abandoned.

(30) Foreign Application Priority Data

Nov. 10, 1997 (DE) .......................... 197 49 642

(51) Int. Cl.$^7$ ................................. B05D 3/06
(52) U.S. Cl. ................ 427/393.6; 427/385.5; 427/508; 427/496; 427/407.1
(58) Field of Search .................. 427/508, 496, 427/385.5, 393.6, 407.1

(56) References Cited

U.S. PATENT DOCUMENTS

| | | |
|---|---|---|
| 3,043,790 A | 7/1962 | Sanders |
| 3,196,122 A | 7/1965 | Evans |
| 3,239,479 A | 3/1966 | Roenicke et al. |
| 4,125,673 A | 11/1978 | Roth et al. |
| 4,146,672 A * | 3/1979 | Jasperson .......... 428/332 |
| 4,340,510 A | 7/1982 | Howanietz et al. |
| 4,340,533 A | 7/1982 | Rody |
| 4,456,726 A | 6/1984 | Siol et al. |
| 4,617,349 A | 10/1986 | Nasu et al. |
| 4,755,815 A | 7/1988 | Savoyet et al. |
| 4,855,334 A | 8/1989 | Maruyama et al. |
| 4,999,218 A | 3/1991 | Rehmer et al. |
| 5,047,295 A | 9/1991 | Dotzauer et al. |
| 5,128,386 A | 7/1992 | Rehmer et al. |
| 5,162,415 A | 11/1992 | Rehmer et al. |
| 5,310,769 A | 5/1994 | Konig et al. |
| 5,352,720 A | 10/1994 | Aydin et al. |
| 5,418,006 A | 5/1995 | Roth et al. |
| 5,426,146 A | 6/1995 | Aydin et al. |
| 5,442,006 A | 8/1995 | Aydin et al. |
| 5,512,629 A | 4/1996 | Beckerle et al. |
| 5,576,404 A | 11/1996 | Beckerle et al. |
| 5,612,434 A * | 3/1997 | Epple et al. .......... 526/282 |
| 5,624,992 A | 4/1997 | Aydin et al. |
| 5,696,185 A | 12/1997 | Beckerle et al. |
| 5,718,943 A | 2/1998 | Hsu et al. |
| 5,756,574 A | 5/1998 | Baumstark et al. |

FOREIGN PATENT DOCUMENTS

| | | |
|---|---|---|
| CA | 2046215 | 1/1992 |
| CA | 2046216 | 1/1992 |
| DE | 2 164 256 | 6/1973 |
| DE | 3 147 008 | 6/1983 |
| DE | 3 827 975 | 3/1990 |
| DE | 3 901 073 | 7/1990 |
| DE | 4 213 967 | 11/1993 |
| DE | 4 317 035 | 11/1994 |
| DE | 4 435 422 | 4/1996 |
| EP | 13 443 | 7/1980 |
| EP | 126 699 | 11/1984 |
| EP | 0 040 419 | 7/1985 |
| EP | 0 264 903 | 4/1988 |
| EP | 417 568 | 3/1991 |
| EP | 469 295 | 2/1992 |
| EP | 567 819 | 11/1993 |
| EP | 567 881 | 11/1993 |
| GB | 1 411 268 | 10/1975 |
| GB | 1 505 558 | 3/1978 |

OTHER PUBLICATIONS

Chemical Abstracts, DE 4 317 036, Nov. 24, 1994.
Chemical Abstracts, JP 3 131 533, Jun. 5, 1991.
DE 4,003,909, submitted herewith is the corresponding Chemical Abstracts of EP 441 221, Aug. 14, 1991.
EP 469 295, submitted herewith is the corresponding Chemical Abstracts of DE 4 021 502, Jan. 16, 1992.
Chemical Abstracts, DE 19 514 266, Oct. 17, 1996.
Ullmanns Encyclopedia of Ind. Chem., 5ed., vol. A 21, pps. 169–171, 1992 (no mo.).
A. Zosel, Farbe Und Lack, vol. 82, No. 2, pps. 125–134, "Methoden der Kunststoffphysik in der Lackprufung", 1976. (no mo.).
T.G. Fox, Bull. Am. Phys. Soc. (Ser. II), vol. 1, p. 123, 1956 (no mo.).
Houben–Weyl, Methoden D. org. Chemie, vol. XIV/1, Makromol. Chem. Thieme–Verlag, pp. 411–420 (with English Abstract) and pp. 192–208, 1961 (no mo.).
Encyclopedia of Polymer Science and Technology, vol. 5, pp. 847–848, 1966 (no mo.).
DE 4 435 423, Oct. 4, 1994, submitted ehrewith is corresponding Chemcal Abstracts of WO 95/33775, Dec. 14, 1995.
DE 4 419 518, Oct. 4, 1994, submitted herewith is corresponding Chemical Abstracts of WO 95/33775, Dec. 14, 1995.
Derwent Abstracts, JP 55–44273, Nov. 11, 1980.

* cited by examiner

*Primary Examiner*—Shrive P. Beck
*Assistant Examiner*—Michael Cleveland
(74) *Attorney, Agent, or Firm*—Oblon, Spivak, McClelland, Maier & Neustadt, P.C.

(57) ABSTRACT

Aqueous formulations comprising as film-forming constituent at least one copolymer P, synthesized from ethylenically unsaturated monomers M, are used for coating shaped mineral articles, the copolymer P having a glass transition temperature in the range from −25 to +80° C. and the monomers M comprising more than 0.2% by weight and up to 5% by weight, based on their overall weight, of itaconic acid as monomer M1.

9 Claims, No Drawings

METHOD OF COATING A SHAPED MINERAL ARTICLE

This application is a Continuation of application Ser. No. 09/188,326, Filed on Nov. 9, 1998, now abandoned.

The present invention relates to a method of coating a shaped mineral article using aqueous formulations comprising as film-forming constituent at least one copolymer P, synthesized from ethylenically unsaturated monomers M.

By shaped mineral articles are meant hereinbelow, in particular, shaped articles which comprise a mineral binder. Specifically, a shaped article is understood here as being an article produced, after shaping, from a mixture (a mortar) comprising a mineral binder, water, aggregates and, if used, auxiliaries by virtue of the fact that the mineral binder/water mixture hardens as a function of time with or without the action of elevated temperature. Mineral binders are common knowledge. They comprise finely divided inorganic substances, such as lime, gypsum, clay and/or cement, which are stirred up with water to convert them to their ready-to-use form which, when left to itself, hardens over time both in air and underwater, with or without the action of elevated temperature, to give a stonelike mass.

The aggregates consist in general of granular or fibrous, natural or synthetic stone (gravel, sand, mineral fibers), including in special cases metals as well, or organic aggregates or mixtures of said aggregates, with grain sizes or fiber lengths that are adapted in a conventional manner to the specific application intended. In many cases, color pigments are also used as aggregates, for the purpose of coloring.

Particularly suitable auxiliaries are those substances which accelerate or retard hardening or which influence the elasticity or porosity of the solidified, shaped mineral article. In particular the auxiliaries comprise polymers, as are known, for example, from U.S. Pat. No. 4,340,510, GB-PS 15 05 558, U.S. Pat. No. 3,196,122, U.S. Pat. No. 3,043,790, U.S. Pat. No. 3,239,479, DE-A 43 17 035, DE-A 43 17 036, JP-A 91/131 533 and other documents.

Examples of shaped mineral articles to be coated in accordance with the invention are concrete pipes, as used to transport waste water (cf. for example JP-A 55/44 273), concrete roof tiles (cf. for example DE-A 21 64 256 or DE-A 39 01 073) or curb stones, steps, base slabs, and plinth tiles based on mineral binders, and also fiber-reinforced concrete panels, ie. flat shaped mineral articles filled with inorganic or organic fibers such as polyester fibers or nylon fibers, for example.

A disadvantage of shaped mineral articles is that under the influence of weathering (especially exposure to water) the cationic constituents, such as $Ca^{2+}$, are leached out over the course of time, reducing the strength of the articles. Another disadvantageous property of shaped mineral articles is the occurrence of efflorescence phenomena. These are probably attributable to the fact that the mineral binders contain cations with a valency of two or more, such as $Ca^{2+}$, in an alkaline environment. Reaction with the carbon dioxide from the air can therefore cause the formation, on the surface of the shaped mineral articles, of white spots of lime which are unsightly and relatively insoluble in water. The phenomenon of efflorescence may appear either during the hardening of freshly prepared shaped mineral articles or on exposure to weathering of shaped mineral articles which have already hardened.

In order to avoid these disadvantageous properties, the shaped mineral articles are often provided with a coating. For this purpose use is generally made of aqueous coating systems whose film-forming constituent comprises an aqueous polymer dispersion. Customary binders include styrene-acrylate copolymers, vinyl acetate homo- and copolymers, pure acrylates and the like (cf. for example DE 21 64 256). However, the coatings obtainable with these binders are unable to prevent satisfactorily the emergence of the cationic constituents (efflorescence). Furthermore, such coatings are easily soiled.

DE-A-38 27 975 and DE-A-40 03 909 disclose coatings for concrete slabs that are based on aqueous polymer dispersions comprising at least one aromatic ketone as photosensitizer. The photosensitizer causes superficial crosslinking of the coating. Although this largely prevents the unwanted efflorescence, the coatings are not stable under long-term weathering.

It has proven possible to improve the protection of shaped mineral articles from the efflorescence described above by using the coating compositions based on styrene/acrylate dispersions or pure acrylate dispersions of EP-A-469 295 and DE-A-195 14 266. EP-A-469 295 recommends for this purpose the use of a specific anionic emulsifier, and DE-A-195 14 266 the use of polymers whose incorporated monomers include specific, sulfonate-functional monomers.

The prior art coatings all have the disadvantage of comparatively high water absorption. This water absorption carries with it the risk that low molecular mass constituents in the coating, such as surfactants, which are frequently employed to prepare the aqueous formulations, will be leached out in the course of prolonged weathering. Such leaching is manifested, for example, in intensified blushing or in embrittlement of the coating. The uptake of water, moreover, owing to the polymer swelling which accompanies it, causes a drop in the mechanical stability of the coating and an increase in the slipperiness of the surface, which is likewise undesirable on safety grounds. With pigmented coatings, moreover, there is the danger that the perceived color will be adversely altered should the coating take up water.

It is an object of the present invention to provide coatings for shaped mineral articles which feature low water absorption and at the same time do not suffer any adverse alteration in their strength and visual appearance even on prolonged exposure to moisture.

We have found that this object is achieved and that the water uptake of coatings based on copolymers of ethylenically unsaturated monomers can be reduced if the monomers copolymerized include from more than 0.2% by weight up to 5% by weight of itaconic acid, based on the overall amount of monomer to be polymerized.

Copolymers comprising itaconic acid are known in principle from EP-A-264 903, where the itaconic acid is used to enhance the mechanical stability of elastomeric polymers based on alkyl acrylate. As far as references to the weathering stability and water uptake of such polymers on weathering are concerned, EP-A-264 903 gives none.

The present invention therefore provides for the use of aqueous formulations comprising as film-forming constituent at least one copolymer P, synthesized from ethylenically unsaturated monomers M, for coating shaped mineral articles, the copolymer P having a glass transition temperature $T_g$ in the range from −25 to +80° C. and the monomers M comprising more than 0.2% by weight and up to 5% by weight, based on their overall weight, of itaconic acid as monomer M1.

The monomers M from which the copolymer P is synthesized preferably comprise from 0.3 to 4% by weight and, in particular, from 0.5 to 3% by weight of itaconic acid. Although itaconic anhydride can be used for the preparation, instead of the acid, it is preferred to employ itaconic acid itself as monomer M1.

The polymers containing itaconic acid are usually prepared by free-radical polymerization of ethylenically unsaturated monomers M comprising itaconic acid plus at least one further comonomer. Appropriate comonomers are generally selected from vinylaromatic monomers, such as styrene, α-methylstyrene, o-chlorostyrene or vinyltoluenes, from the vinyl esters of aliphatic $C_1$–$C_{18}$ monocarboxylic acids, such as vinyl acetate, propionate, butyrate, valerate, hexanoate, 2-ethylhexanoate, decanoate, pivalate, laurate and stearate, and also commercial monomers VEOVA® 5–11 (VEOVA® X is a trade name of Shell and stands for vinyl esters of versatic® X acids—α-branched aliphatic carboxylic acids of X carbons), and from the esters of ethylenically unsaturated $C_3$–$C_8$ mono- or dicarboxylic acids with $C_1$–$C_{18}$-, preferably $C_1$–$C_{12}$- and, in particular, $C_1$–$C_8$-alkanols or $C_5$–$C_8$-cycloalkanols. Examples of suitable $C_1$–$C_{18}$-alkanols are methanol, ethanol, n-propanol, i-propanol, 1-butanol, 2-butanol, isobutanol, tert-butanol, n-hexanol, 2-ethylhexanol, lauryl alcohol and stearyl alcohol. Examples of suitable cycloalkanols are cyclopentanol and cyclohexanol. Particularly suitable are the esters of acrylic, methacrylic, crotonic, maleic, itaconic, citraconic or fumaric acid. Specifically, these are the esters of acrylic and/or methacrylic acid, such as methyl, ethyl, isopropyl, n-butyl, isobutyl, 1-hexyl, tert-butyl and 2-ethylhexyl (meth)acrylate, and also the esters of fumaric and maleic acid, such as dimethyl fumarate, dimethyl maleate and di-n-butyl maleate, for example. Nitriles of α,β-monoethylenically unsaturated $C_3$–$C_8$ carboxylic acids, such as acrylonitrile or methacrylonitrile, are further suitable comonomers. It is additionally possible to employ $C_4$–$C_8$ conjugated dienes; such as 1,3-butadiene, isoprene or chloroprene, α-olefins, such as ethylene, propene and isobutene, and also vinyl chloride or vinylidene chloride as comonomers.

In addition to the itaconic acid the monomers M preferably include at least two further monomers M2 and M3, different from one another, as comonomers. They are preferably selected from the abovementioned vinylaromatic monomers, from the abovementioned esters of ethylenically unsaturated $C_3$–$C_8$ monocarboxylic acids with $C_1$–$C_{12}$-alkanols, and from the vinyl esters of aliphatic $C_1$–$C_{12}$ monocarboxylic acids. The monomers M2 and M3 generally account for at least 65% by weight, preferably at least 80% by weight and, in particular, at least 90% by weight of the overall monomer amount. The others of the abovementioned comonomers (referred to below as comonomers M') are generally used in amounts <30% by weight, preferably <20% by weight and, in particular, <10% by weight, based on the overall amount of monomers M. A preferred embodiment of this invention relates to copolymers P containing none of the abovementioned comonomers M'.

In addition to the abovementioned comonomers M1, M2, M3 and, if used, M', and to itaconic acid, the monomers M may also include further, hydrophilic monomers M4 whose homopolymers are of increased solubility or swellability in water. These include monoethylenically unsaturated $C_3$–$C_8$ monocarboxylic acids, such as acrylic, methacrylic, crotonic, vinylacetic, alcrylamidoglycolic and methacrylamidoglycolic acid, their amides, such as acrylamide and methacrylamide, the monoethylenically unsaturated $C_4$–$C_8$ dicarboxylic acids, such as maleic, fumaric and citraconic acid, their monoesters with $C_1$–$C_{12}$-alkanols, such as monomethyl maleate and mono-n-butyl maleate, ethylenically unsaturated sulfonic acids, such as vinyl-, 2-acrylamido-2-methylpropane-, 2-acryloxyethane- and 2-methacryloxyethane-sulfonic acid, 3-acryloxy- and 3-methacryloxypropanesulfonic acid, vinylbenzenesulfonic acid and the salts thereof, preferably the alkali metal salts or ammonium salts, and especially the sodium salts, thereof. The monomers M3 further include hydroxyalkyl esters of the abovementioned ethylenically unsaturated mono- and dicarboxylic acids, such as hydroxyethyl, hydroxypropyl and 4-hydroxybutyl acrylate, for example, the corresponding methacrylates, and water soluble N-vinyllactams, such as N-vinylpyrrolidone. Preferred monomers M4 are acrylic, methacrylic, maleic, fumaric and citraconic acid and especially acrylamide and methacrylamide. Where they are desired, the monomers M4 can be employed in amounts of from 0.1 to 4.8% by weight, based on the overall monomer amount. In general the overall amount of the monomers M4+M1 will not exceed 5% by weight, based on the overall monomer amount, preferably 4% by weight and, in particular, 3% by weight. A preferred embodiment of the present invention relates to copolymers P comprising not only itaconic acid but also one of the abovementioned amides of monoethylenically unsaturated carboxylic acids in copolymerized form. Another preferred embodiment relates to copolymers P which other than itaconic acid comprise no further hydrophilic, copolymerized monomer M4.

The monomers M may also comprise monomers M5, which enhance the strength of the coatings. These monomers are copolymerized in minor amounts, generally up to 10% by weight, preferably up to 5% by weight and, in particular, up to 1% by weight, based on the overall amount of monomers M to be polymerized. They are monomers containing at least one epoxy, N-alkylol or carbonyl group.

Examples of the N-hydroxyalkyl- and N-alkylolamides of α,β-monoethylenically unsaturated carboxylic acids of 3 to 10 carbons, such as 2-hydroxyethyl(meth)acrylamide and N-methylol(meth)acrylamide, ethylenically unsaturated glycidyl ethers and glycidyl esters, such as vinyl, allyl and methallyl glycidyl ether, glycidyl acrylate and glycidyl methacrylate, for example, the diacetonylamides of the abovementioned ethylenically unsaturated carboxylic acids, such as diacetorie(meth)acrylamide, and the esters of acetylacetic acid with the abovementioned hydroxyalkyl esters of ethylenically unsaturated carboxylic acids, such as acetylacetoxyethyl (meth)acrylate. The monomers M5 also include compounds having two nonconjugated, ethylenically unsaturated bonds, examples being diesters of dihydric alcohols with α,β-monoethylenically unsaturated $C_3$–$C_{10}$ monocarboxylic acids. Examples of such compounds are alkylene glycol diacrylates and dimethacrylates, such as ethylene glycol diacrylate, 1,3-butylene glycol diacrylate, 1,4-butylene glycol diacrylate, propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate, tricyclodecenyl (meth)acrylate, N,N'-divinylimidazblin-2-one or triallyl cyanurate. A preferred embodiment of this invention relates to copolymers P containing no monomer M5.

The monomers M may also of course include compounds which are known to improve the pigment binding power of the copolymers P. Examples of these are siloxane-functional monomers, such as the vinyltrialkoxysilanes, examples being vinyltrimethoxysilane, alkylvinyldialkoxysilanes or (meth)acryloxyalkyltrialkoxysilanes, such as (meth)acryloxyethyltrimethoxysilane, (meth)acryloxypropyltrimethoxysilane. These monomers can, where desired, be used in amounts of up to 1% by weight, preferably from 0.05 to 0.5% by weight, based on the overall monomer amount.

Furthermore, it is essential to the invention for the copolymer to have a glass transition temperature of from −25 to +80° C. It should be borne in mind here that a high-quality coating is only obtained when the aqueous formulation of the film-forming copolymer P has a minimum film-forming temperature which is below the application temperature. This minimum film-forming temperature depends in turn on the glass transition temperature $T_g$ of the copolymer P (see Ullmann's Encyclopedia of Industrial Chemistry, 5th ed, Vol. A 21, 1992, p. 169). Accordingly, a low glass transition temperature of the copolymer P leads in principle to improved filming. On the other hand, a low glass transition temperature entails increased tackiness of the coating and hence an increased likelihood of the coating becoming soiled. Moreover, a low glass transition temperature generally is the cause of deterioration in blocking resistance. In principle the minimum film-forming temperature can be influenced by adding what are known as external plasticizers of low volatility to the aqueous formulation, such as esters of phthalic acid, and/or highly volatile, low-boiling organic solvents, as film-forming auxiliaries.

It has proven advantageous to tailor the formulations that are employed in accordance with the invention to their specific end applications by choosing an appropriate glass transition temperature for the copolymer P. For instance, a glass transition temperature $T_g$ for the copolymers P of above −10° C. and, in particular, above +10° C. has been found advantageous for the coating of concrete slabs. In this embodiment of the invention it is preferred not to exceed a $T_g$ of +50° C. In the case of fiber-reinforced concrete slabs, which both can be coated at elevated temperature and are intended to have a high blocking resistance, on the other hand, a glass transition temperature of above +20° C., and in particular above +40° C., has been found advantageous. The glass transition temperature $T_g$ referred to here is the midpoint temperature determined in accordance with ASTM D 3418-82 by differential thermal analysis (DSC) (cf. Ullmann's Encyclopedia of Industrial Chemistry, 5th Edition, Volume A 21, VCH Weinheim 1992, pp. 169 and also Zosel, Farbe und Lack 82 (1976), pp. 125–134, see also DIN 53765). The glass transition temperature can also be determined from the measurement of the modules of elasticity in the creep test as a function of temperature.

It proves useful in this context to estimate the glass transition temperature $T_g$ of the copolymer P. According to Fox (T. G. Fox, Bull. Am. Phys. Soc. (Ser. II) 1, 123 [1956] and Ullmanns Enzyklopädie der technischen Chemie, Weinheim (1980), pp. 17, 18) the glass transition temperature of copolymers with a low degree of crosslinking, at high molar masses, is given in good approximation by $$\frac{1}{T_g} = \frac{X^1}{T_g^1} + \frac{X^2}{T_g^2} + \cdots \frac{X^n}{T_g^n}$$

where $X^1, X^2, \ldots, X^n$ are the mass fractions $1, 2, \ldots, n$, and $T_g^1, T_g^2, \ldots, T_g^n$ the glass transition temperatures, of the homopolymers of the monomers $1, 2, \ldots, n$, in kelvins. The latter are given, for example, in Ullmann's Encyclopedia of Industrial Chemistry, VCH, Weinheim, Vol. A 21 (1992) p. 169 or in J. Brandrup, E. H. Immergut, Polymer Handbook $3^{rd}$ ed., J. Wiley, New York 1989.

From what has been said above it is clear that the glass temperature $T_g$ of the copolymer P can be adjusted either by means of an appropriate principal monomer M having a glass temperature within the desired range or by combining at least one monomer M2 of high glass transition temperature and at least one monomer M3 of low glass transition temperature.

In a preferred embodiment of the present invention the constituent monomers M of the polymer of component A comprise at least one monomer M2 whose homopolymer, for the limiting case of a very high molecular weight, has a glass transition temperature $T_g>30°$ C. and at least one monomer M3 whose homopolymer has a glass transition temperature $T_g<20°$ C. Examples of suitable monomers M2 are styrene, α-methylstyrene, methyl methacrylate, ethyl methacrylate, n- and isopropyl methacryate, n-, iso- and tert-butyl methacrylate, and tert-butyl acrylate. Examples of suitable monomers M3 are the $C_1$–$C_{10}$-alkyl acrylates, butadiene, vinyl Versatates, especially ethyl acrylate, n-butyl acrylate and 2-ethylhexyl acrylate. Particular preference is given to monomer combinations M2/M3 which comprise styrene and/or methyl methacrylate alone or together with tert-butyl acrylate, n-butyl methacrylate and/or tert-butyl methacrylate as monomers M2 and also n-butyl acrylate and/or 2-ethylhexyl acrylate as monomers M3. The weight ratio of monomers M2 to M3 is usually within the range from 30:70 to 70:30 and in particular in the range from 35:65 to 65:35. Typical monomer combinations M2/M3 are:

styrene: n-butyl acrylate in a weight ratio of 35:65–80:20, styrene: 2-ethylhexyl acrylate in a weight ratio of 35:65–80:20, methyl methacrylate: n-butyl acrylate in a weight ratio of 40:60–80:20, methyl methacrylate: 2-ethylhexyl acrylate in a weight ratio of 35:65–80:20, and also ternary and quaternary monomer mixtures M2/M3 in which some of the styrene is replaced by methyl methacrylate and/or n-butyl methacrylate, or some of the n-butyl acrylate by 2-ethylhexyl acrylate, examples being:

methyl methacrylate: styrene: 2-ethylhexyl acrylate in a weight ratio of 20:20:60, n-butyl methacrylate: styrene: 2-ethylhexyl acrylate in a weight ratio of 35:10:55, methyl methacrylate: n-butyl methacrylate: n-butyl acrylate in a weight ratio of 30:35:35 styrene: n-butyl acrylate: 2-ethylhexyl acrylate in a weight ratio of 50:25:25 and styrene: methyl methacrylate: n-butyl acrylate: 2-ethylhexyl acrylate in a weight ratio of 20:20:30:30.

The copolymers P present in the aqueous formulations that are employed in accordance with the invention can in principle be prepared by any conceivable method for the free-radical copolymerization of ethylenically unsaturated monomers, for example, by solution, precipitation, bulk, emulsion or suspension polymerization. The free-radical aqueous emulsion polymerization of the abovementioned monomers is preferred, in the presence of at least one free-radical polymerization initiator and, if desired, one or more surface-active substances, since in this case the copolymers P are actually obtained in the form of an aqueous suspension. It is also possible, however, to operate by the other polymerization methods. It may then be necessary, if appropriate, to carry out subsequent conversion of the copolymers P to an aqueous dispersion (secondary dispersion). The copolymers P can also be employed in the form of a solution in a water/solvent mixture.

The formulations of the invention preferably contain the copolymer P in the form of an aqueous dispersion. The particles of copolymer in this dispersion can have average sizes in the range from 50 to 1000 nm. Methods of adjusting the polymer particle size are known, for example, from EP-A-126 699, EP-A-567 881, EP-A-567 819, DE-A-31 47 008 and DE-A-42 13 967.

Suitable free-radical polymerization initiators are all those that are able to trigger a free-radical aqueous emulsion polymerization; they may be peroxides, such as alkali metal peroxodisulfates, or azo compounds. It is preferred to use redox initiator systems, which are composed of at least one organic reducing agent and at least one peroxide and/or hydroperoxide, for example tert-butyl hydroperoxide, with a sulfur compound, such as the sodium salt of hydroxymethanesulfinic acid, sodium sulfite, sodium disulfite, sodium thiosulfate or acetone bisulfite, or hydrogen peroxide with ascorbic acid. It is also possible for this purpose to use redox initiator systems containing a small amount of a metal compound which is soluble, in the polymerization medium and whose metallic component is able to exist in two or more valence states, an example being ascorbic acid/iron(II) sulfate/hydrogen peroxide, in which case the ascorbic acid is frequently replaced by the sodium salt of hydroxymethanesulfinic acid, acetone bisulfite, sodium sulfite, sodium hydrogensulfite or sodium bisulfite and the hydrogen peroxide by organic peroxides, such as tert-butyl hydroperoxide, or by alkali metal peroxodisulfates and/or ammonium peroxodisulfate. Likewise preferred initiators are peroxodisulfates, such as sodium peroxodisulfate or ammonium peroxodisulfate. The amount of free-radical initiator systems employed, based on the overall amount of monomers to be polymerized, is preferably from 0.05 to 2% by weight, more preferably from 0.1 to 1% by weight.

Surface-active substances suitable for conducting the emulsion polymerization are the emulsifiers and protective colloids that are normally employed for such purposes. The surface-active substances are usually employed in amounts of up to 10% by weight, preferably from 0.5 to 5% by weight and, in particular, from 1 to 4% by weight, based on the monomers to be polymerized.

Examples of suitable protective colloids are polyvinyl alcohols, starch derivatives and cellulose derivatives, or vinylpyrrolidone copolymers. A detailed description of further suitable protective colloids is given in Houben-Weyl, Methoden der organischen Chemie, Volume XIV/1, Makromolekulare Stoffe [macromolecular substances], Georg-Thieme-Verlag, Stuttgart 1961, pp. 411–420. Mixtures of emulsifiers and/or protective colloids can also be used. As surface-active substances it is preferred to use exclusively emulsifiers, whose relative molecular weights, in contradistinction to the protective colloids, are usually below 2000. They can be anionic, cationic or nonionic in nature. The anionic emulsifiers include alkali metal and ammonium salts of alkyl sulfates (alkyl: $C_8$–$C_{12}$), of sulfuric monoesters of ethoxylated alkanols (EO units: 2 to 50, alkylz $C_{12}$ to $C_{18}$) and ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$). Further suitable emulsifiers are given in Houben-Weyl, op. cit., pp. 192–208.

The anionic surface-active substances also include compounds of the formula I,

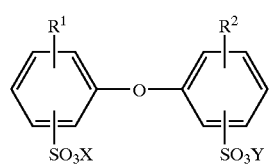

(I)

where $R^1$ and $R^2$ are hydrogen or $C_4$–$C_{24}$-alkyl but are not both hydrogen, and X and Y can be alkali metal and/or ammonium ions. $R^1$ and $R^2$ are preferably linear or branched alkyls of 6 to 18 carbons or hydrogen, and in particular have 6, 12 or 16 carbons, and are not both simultaneously hydrogen. X and Y are preferably sodium, potassium or ammonium, particular preference being given to sodium. Particularly advantageous compounds I are those in which X and Y are sodium, $R^1$ is a branched alkyl of 12 carbons and $R^2$ is hydrogen or is the same as $R^1$. Use is frequently made of technical mixtures containing from 50 to 90% by weight of the monoalkylated product, an example being Dowfax® 2A1 (trademark of Dow Chemical Company). The compounds I are common knowledge, for example from U.S. Pat. No. 4,269,749, and are obtainable commercially.

In addition to the abovementioned anionic emulsifiers it is also possible to use nonionic emulsifiers. Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and polyethylene oxide/polypropylene oxide block copolymers. Preference is given to ethoxylates of long-chain alkanols (alkyl: $C_{10}$–$C_{22}$, mean degree of ethoxylation: 3 to 50) and, of these, particular preference to those based on oxo alcohols and native alcohols of the linear or branched $C_{12}$–$C_{18}$-alkyl radical and a degree of ethoxylation of from 8 to 50. It is preferred to employ anionic emulsifiers, especially emulsifiers of the formula I, or combinations of at least one anionic with at least one nonionic emulsifier.

The molecular weight of the polymers can be adjusted by adding small amounts, generally up to 2% by weight based on the monomers to be polymerized, of one or more molecular weight regulators, examples of these being organic thio compounds, silanes, allyl alcohols and aldehydes.

The emulsion polymerization can be conducted either continuously or batchwise, preferably by a semicontinuous procedure. In this case the monomers to be polymerized can be supplied continuously, including by a stepwise or gradient regime, to the polymerization batch.

The monomers can be supplied to the polymerization either as a monomer mixture or else as an aqueous monomer emulsion. Preferably, all or some of the itaconic acid is in the monomer emulsion that is to be added. The initial charge preferably contains no monomers, or itaconic acid as sole monomer.

Away from the seed-free preparation procedure, a defined polymer particle size can also be established by conducting the emulsion polymerization in accordance with the seed latex technique or in the presence of seed latex prepared in situ. Techniques of this kind are known and can be found in the prior art (see EP-B 40419 and 'Encyclopedia of Polymer Science and Technology', Vol. 5, John Wiley & Sons Inc., New York 1966, p. 847).

In a preferred embodiment of the present invention the polymerization is conducted in the presence of from 0.01 to 3% by weight and, in particular, from 0.05 to 1.5% by weight of a seed latex (solids content of the seed latex, based on overall monomer amount), preferably with seed latex introduced at the beginning (initial-charge seed). The latex generally has a weight-average particle size of from 10 to 400 nm, preferably from 20 to 120 nm and, in particular, from 20 to 50 nm. Examples of its constituent monomers are styrene, methyl methacrylate, n-butyl acrylate and mixtures thereof, and the seed latex may also include, in a minor amount, copolymerized monomers M4, such as acrylic and/or methacrylic acid and/or their amides, for example, preferably in an amount of less than 10% of the overall weight of the polymer particles in the seed latex.

The pressure and temperature of polymerization are of minor importance. Polymerization is generally conducted at between room temperature and 120° C., preferably at from 40 to 110° C. and, with particular preference, at from 50 to 100° C.

Following the actual polymerization reaction it is generally necessary to substantially free the aqueous polymer dispersions of the invention from odoriferous substances, such as residual monomers and other volatile organic constituents. This can be done, conventionally, by physical means, through distillative removal (especially by steam distillation) or by stripping with an inert gas. A reduction in the amount of residual monomers can also be achieved chemically, by free-radical postpolymerization, especially under the action of redox initiator systems, as are set out, for example, in DE-A 44 35 423, DE-A 44 19 518 and DE-A 44 35 422. Postpolymerization is preferably conducted with a redox initiator system comprising at least one organic peroxide and an organic sulfite.

In this way it is possible to obtain polymer dispersions with polymer contents of up to 80% by weight, based on the overall weight of the dispersion. For preparing the formulations employed in accordance with the invention it is preferred on practical grounds to employ dispersions having polymer contents in the range from 30 to 70% by weight, in particular from 40 to 65% by weight.

The formulations that are employed in accordance with the invention can take any desired form—in other words, solutions or dispersions—of the copolymers P. The solution or dispersion medium used preferably comprises aqueous solvents; that is, water or mixtures of water with a water-miscible organic solvent, such as a $C_1$–$C_4$-alkanol, examples being methanol, ethanol, n- or iso-propanol, n-, iso-, 2- or tert-butanol, glycol, propylene glycol, butylene glycol, glycerol, diethylene glycol, triethylene glycol, tetrahydrofuran or the like.

The copolymers P of the invention are preferably employed in the form aqueous formulations containing not more than 50% by weight, in particular not more than 20% by weight and specifically not more than 10% by weight, based on the overall weight of the formulation, of water-miscible solvents. With very particular preference, the formulations of the invention, in addition to water, contain no organic solvents other than customary antifreeze agents and film-forming auxiliaries. Within these formulations the copolymers P are generally in the form of aqueous dispersions.

The solutions or dispersions of the copolymers P can, in accordance with the invention, be used as they are. However, the formulations generally include from 0.1 to 30% by weight of customary auxiliaries. In addition the aqueous formulations, in so far as the copolymers P have been prepared by free-radical aqueous emulsion polymerization, also include the surface-active substances employed for this purpose, such as emulsifiers and/or protective colloids.

Examples of customary auxiliaries are wetting agents, fungicides, defoamers, thickeners, antifreezes, leveling assistants, plasticizers and film-forming auxiliaries. Examples of suitable film-forming auxiliaries are ethylene, propylene, butylene, hexylene, diethylene, dipropylene and dibutylene glycol, their monoethers with $C_1$–$C_4$-alkanols, such as diethylene glycol monoethyl or monobutyl ether, propylene glycol monophenyl, monopropyl or monobutyl ether, dipropylene glycol monopropyl or monobutyl ether, their ether acetates, such as diethylene glycol monoethyl and monobutyl ether acetate, propylene glycol monopropyl and monobutyl ether acetate, dipropylene glycol n-butyl ether acetate, and also alkyl esters of aliphatic mono- and dicarboxylic acids, such as Texanol® from Eastman Kodak, or technical-grade mixtures thereof, such as Lusolvan FBH from BASF AG (di-n-butyl ester mixtures of succinic, glutaric and adipic acid). Suitable plasticizers are all those customary for aqueous dispersions, examples being (oligo) propylene glycol alkyl phenyl ethers as are obtainable, for instance, as Plastilit® 3060 from BASF AG.

In addition, the aqueous formulations employed in accordance with the invention may also include inorganic fillers and/or pigments. Examples of typical pigments are titanium dioxide, preferably in the rutile form, barium sulfate, zinc oxide or lithopones (zinc sulfide+barium sulfate). For decorative purposes the formulations may also include colored pigments, examples being iron oxides, carbon black, graphite, zinc yellow, zinc green, ultramarine, manganese black, antimony black, manganese violet, Paris blue or Schweinfurt green. Suitable fillers include alumosilicates, such as feldspars, silicates, such as kaolin, talc, mica, magnesite, alkaline earth metal carbonates, such as calcium carbonate in the form, for example, of calcite or chalk, magnesium carbonate, dolomite, alkaline earth metal sulfates, such as calcium sulfate, and silica, etc.

The aqueous formulations employed in accordance with the invention may also comprise crosslinking additives. Such additives can be aromatic ketones, such as alkyl phenyl ketones with or without one or more substituents on the phenyl ring, or benzophenone and substituted benzophenones as photoinitiators. Photoinitiators suitable for this purpose are known, for example, from DE-A-38 27 975 and EP-A-417 568. Suitable crosslinking compounds are also water-soluble compounds having at least two amino groups, examples being dihydrazides of aliphatic dicarboxylic acids as per DE-A-39 01 073 if the copolymer P comprises carbonyl-containing monomers in copolymerized form.

In a preferred embodiment of the present invention the aqueous formulations are employed in the form of a clearcoat. In this case they generally include, based on their overall weight, from 10 to 60% by weight, preferably from 40 to 55% by weight of at least one copolymer P and from 0.1 to 30% by weight, preferably from 0.5 to 10% by weight, of customary auxiliaries, especially defoamers and/or film-forming auxiliaries.

In another embodiment of the present invention the aqueous formulations are employed in the form of pigmented and/or filled formulations. In this case the total content of copolymer P in the aqueous formulation is within the range from 10 to 60% by weight, preferably in the range from 20 to 40% by weight, the content of auxiliaries is within the range from 0.1 to 30% by weight and preferably within the range from 0.5 to 10% by weight, and the content of fillers and/or pigments is in the range from 10 to 60% by weight and, in particular, from 15 to 40% by weight. The amount of pigments and/or fillers is generally between 50 and 450 parts by weight per 100 parts by weight of copolymer P in the aqueous formulation. Pigment-containing formulations will also, preferably, include a dispersant and/or wetting agent in addition to the film-forming auxiliaries and defoamers.

The present invention also relates to a method of coating shaped mineral articles which comprises applying one of the aqueous formulations described herein to the shaped mineral article. In general the amount of aqueous formulation to be applied (calculated in its wet form) will be from 100 to 700 g/m$^2$, corresponding to a dry add-on of from 50 to 400 g/m$^2$, and, in particular, to a dry add-on of from 100 to 250 g/m$^2$. Application can take place in a manner known per se by spraying, troweling, knife coating, rolling or pouring. The drying which generally follows can be carried out either at room temperature or at an elevated temperature in the range, for example, of from 40 to 100° C.

The method of the invention can be applied to all shaped articles comprising a mineral binder. It develops its preferential effects when applied to shaped mineral articles comprising cement as their binder (precast concrete products and fiber-reinforced cement slabs). By precast concrete products are meant shaped structures made of concrete and/or gas concrete, such as slabs, pipes and/or roof tiles. The precast concrete product is produced conventionally from ready-mixed concrete by an extrusion process. The aqueous formulations of the invention have the advantage here that they can be applied not only to a precast concrete product which has already set but also to the freshly produced and not yet set "green" product. Drying of the green precast concrete products coated in accordance with the invention can be carried out conventionally, either at room temperature or elevated temperature. The coated green precast concrete product is preferably introduced into what is known as a chamber, where it is set in a process lasting from about 6 to 24 hours at from 40 to 70° C. and during which the copolymer of the coating composition forms a film. Following this process, the product is preferably sprayed a second time with the aqueous formulation of the invention. The second drying operation takes place in a tunnel furnace at temperatures of the circulating air of around 100° C.

Shaped mineral articles which have already set can also be coated at customary ambient temperatures, such as room temperature, with the formulations of the invention.

The advantageous properties of the aqueous formulations of the invention also apply in the case of shaped mineral articles that have been coated with a cement slurry. Such a slurry generally encompasses the customary pigments, a cement as mineral binder, customary auxiliaries and water in an appropriate amount, and is applied to the shaped mineral article, preferably a precast concrete products, which has not yet finally set. After setting, the cement slurry coat has a thickness in the range from 200 to 2000 μm. The aqueous formulations of the invention can be applied in the same way as described above.

The aqueous formulations of the invention prove to be equally advantageous when applied to fiber-reinforced concrete slabs; that is, flat, shaped mineral articles which comprise cement as binder and also mineral or organic fibers, such as polyester and/or polyamide fibers, as aggregates. The application of the aqueous formulations of the invention generally takes place as described for green precast concrete products.

The shaped mineral articles coated in accordance with the invention are notable firstly for the fact that their coating takes up much less water than customary coatings on exposure to wet-weather conditions. This enhances the non-slip properties, for example, of the coatings. In addition, pigmented formulations feature much less color alternation on exposure to wet-weather conditions. Another feature of the coatings is their increased strength even under wet climatic conditions. Further still, the shaped coated articles are effectively protected against efflorescence. This property, like the improved nonslip property, is particularly significant for concrete roof tiles, which therefore constitute a preferred embodiment of the invention. In addition to this, the coatings are resistant to blocking.

Use of the aqueous formulations of the invention leads accordingly to enhanced preservation of the surface of shaped mineral articles. The shaped mineral articles thus coated are novel and are likewise provided by the present invention.

The method of the invention for coating shaped mineral articles can be expanded by applying, to the initial coating with the aqueous formulations of the invention, a further, radiation-curable formulation and then carrying out full curing by means of high-energy radiation, for example by means of UV light with a wavelength in the range from 200 to 400 nm, or by irradiation with high-energy electrons (electron beams; 100 to 350 kev).

A comprehensive account of radiation-curable formulations that are suitable in accordance with the invention is given, for example, in P. K. T. Oldring (ed.), Chemistry and Technology of UV- and EB-formulations for Coatings and Paints, Volume II, SITA Technology, London, 1991. In general, the radiation-curable formulations include at least one organic oligomer or polymer having at least two acrylate and/or methacrylate groups in the molecule. The term oligomer or polymer, hereinbelow, embraces addition polymers, condensation polymers and polyaddition products, chemically modified polymers, and polymers obtainable by reacting polyfunctional compounds having at least two reactive groups with monofunctional or polyfunctional compounds which are able to react with the polyfunctional compounds and which in doing so form bonds.

Appropriate prepolymers generally have a number-average molecular weight $M_n$>500 g/mol. Such polymers or oligomers in general contain from 0.1 to 1.0 mol of acrylate or methacrylate groups per 100 g of polymer/oligomer.

The irradiation-curable formulations that are employed in accordance with the invention may, in addition to the oligomers/polymers, also include what are known as reactive diluents. This term is used to describe compounds of low molecular mass having generally 1 to 4 ethylenically unsaturated double bonds per molecule, preferably taking the form of acrylate or methacrylate groups, which on curing react with the acrylate and/or methacrylate groups of the polymers/oligomers to form a high molecular mass network. In accordance with the invention, however, it is also possible to employ radiation-curable formulations comprising exclusively acrylate- and/or methacrylate-functional polymers/oligomers with or without an inert solvent/diluent.

Preference is given to radiation-curable formulations in which the polymers/oligomers and, if used, reactive diluents contain no aromatic structural units, in other words no phenyl or naphthyl groups.

The radiation-curable formulations employed in accordance with the invention generally include oligomers or polymers typical for this purpose, examples being silicone acrylates, urethane acrylates, acrylate-modified polyesters or polyester acrylates, epoxy acrylates, polyether acrylates, melamine acrylates and also acrylate-modified copolymers based on hydroxyl-containing polymers of ethylenically unsaturated monomers. By way of example there may be mentioned the radiation-curable, aqueous polyurethane dispersions of EP-A-704 469 and EP-A-480 251, the acrylate-modified melamine resins of EP-A-464 466, the urethane acrylates of EP-A-447 845, the acrylate-modified epoxy resins of U.S. Pat. No. 5,057,587, and the radiation-curable polymers and prepolymers that are specified in EP-A-12 339 and EP-A-279 303. The documents referred to are incorporated fully herein by reference.

Typical reactive diluents are the esters of ethylenically unsaturated carboxylic acids with mono- or polyfunctional alcohols, examples being the esters of diethylene, triethylene or dipropylene glycol, of butanediol, pentanediol, hexanediol or of neopentyl glycol, of alkoxylated phenolic compounds, such as ethoxylated and propoxylated bisphenols, of cyclohexanedimethanol, of glycerol, of trimethylolpropane, of butanetriol, of trimethylolethane, of pentaerythritol, of ditrimethylolpropane, of dipentaerythritol, of sorbitol or of mannitol, etc., with—in particular—acrylic and/or methacrylic acid. A comprehensive account of suitable polymers/oligomers and reactive diluents is given in P. K. T. Oldring (loc. cit.) and in P 197 32 621.8, to which reference should be made for further details.

Depending on specific type the radiation-curable formulations comprise customary auxiliaries, such as thickeners, leveling assistants, defoamers, UV stabilizers, emulsifiers and/or protective colloids and fillers. Suitable auxiliaries are sufficiently well known to the skilled worker from paint technology. Suitable fillers, especially for aqueous suspensions of radiation-curable polymers, embrace, inter alia, silicates, which are obtainable by hydrolysis of silicone tetrachloride (Aerosil® from Degussa), silica, talc, aluminum silicates, magnesium silicates, calcium carbonates, etc. suitable stabilizers include typical UV absorbers, such as oxanilides, triazines, benzotriazoles (obtainable as Tinuvin® grades from Ciba Geigy) and benzophenones. These can be employed in combination with customary free-radical scavengers, examples of which are sterically hindered amines, such as 2,2,6,6-tetramethylpiperidine and 2,6-di-tert-butylpiperidine and derivatives thereof—for example, those in EP-A-13 443 (HALS compounds). Stabilizers are normally employed in amounts of from 0.1 to 5.0 and, preferably, from 0.5 to 2.5% by weight, based on the polymerizable components that are present in the formulation.

If curing is by UV radiation the formulations employed in accordance with the invention include at least one photoinitiator. When curing is carried out by irradiation with high-energy electrons (electron beam curing) the use of photoinitiators can be dispensed with. Examples of appropriate photoinitiators are benzophenone and derivatives thereof, such as 4-phenylbenzophenone and 4-chlorobenzophenone, Michler's ketone, anthrone, acetophenone derivatives, such as 1-benzoylcyclohexan-1-ole, 2-hydroxy-2,2-dimethylacetophenone and 2,2-dimethoxy-2-phenylacetophenone, benzoin and benzoin ethers, such as methyl, ethyl and butyl benzoin ether, benzil ketals, such as benzil dimethyl ketal, 2-methyl-1-[4-(methylthio)phenyl]-2-morpholinopropan-1-one, anthraquinone and its derivatives, such as β-methylanthraquinone and tert-butylanthraquinone, acylphosphine oxides, such as 2,4,6-trimethylbenzoyldiphenylphosphine oxide, ethyl 2,4,6-trimethylbenzoylphenylphosphinate and bisacylphosphine oxides.

The photoinitiators are generally employed in amounts of from 0.05 to 20% by weight, preferably from 0.1 to 10% by weight and, in particular, from 0.1 to 5% by weight, based on the overall weight of the polymerizable components of the radiation-curable formulation.

The radiation-curable formulations are generally applied as described for the above formulations of the copolymers P; that is, for example, applied by means of spraying, troweling, knife coating, brushing, rolling or pouring, to the shaped mineral article that has been provided with an initial coating of the formulations of the invention. Also conceivable is application of the radiation-curable formulations by hotmelt or powder coating techniques to the initially coated shaped mineral articles. The coating weight is generally in the range from 3 to 200 g/m$^2$, preferably from 10 to 100 g/m$^2$, based on the polymerizable components present in the formulation. Application can be made either at room or at elevated temperature, but preferably at no higher than 100° C. The coatings are then cured by exposure to high-energy radiation, preferably UV radiation with a wavelength of 250 to 400 nm, or by irradiation of high-energy electrons (electron beams; 150 to 300 keV). Examples of the UV sources used are high-pressure mercury vapor lamps, such as the CK or CK1 sources from IST. The radiation dose usually sufficient for crosslinking lies within the range from 80 to 3000 mJ/cm$^2$. Any solvent present, especially water, is removed before curing in a separate drying step preceding curing, for example by heating at from 40 to 80° C., or by the action of IR radiation.

It is also possible to apply two or more coats of radiation-curable formulations, of identical or different composition, to the initial coating.

The application of an additional, radiation-curable coating further reduces the uptake of water by the initial coating. There are also further increases in the blocking and scratch resistance of the coatings. This difference becomes particularly significant under moist conditions.

The examples below illustrate the present invention.

Examples

I. Preparing the Film-forming Copolymers P in the Form of Aqueous Dispersions (Dispersions D1 to D3, Comparison Dispersions CD1 to CD8)

Preparation Procedure a) (Dispersions CD1 to CD3, D1)

A polymerization vessel was charged with 400 g of deionized water, 1.4 g of itaconic acid and 6.22 g of emulsifier solution 1 and this initial charge was heated to 85° C.

In a feed vessel 1 an emulsion was prepared from 200.0 g of deionized water 9.3 g of emulsifier solution 1

37.3 g of emulsifier solution 2

413.0 g of methyl methacrylate 287.0 g of n-butyl acrylate 28.0 g of a 50% strength aqueous solution of a copolymerizable acid S or its sodium salt 7.0 g of a 50% strength aqueous solution of acrylamide.

In a second feed vessel 2 a solution was prepared from 1.4 g of sodium peroxodisulfate in 75 g of water.

Subsequently, still at 85° C., 49 g of feed stream 1 and 7.6 g of feed stream 2 were added in succession in one portion to the initial charge, and reaction was allowed to take place for 30 minutes.

This was followed by the addition to the polymerization vessel, beginning concurrently and by way of spatially separate feed ports, of the remaining amounts of feed stream 1, added over the course of 3 h, and of feed stream 2, added over the course of 3.5 h, while-retaining the 85° C. Following the end of feed stream 2 postpolymerization was allowed to take place for 1 h and then the batch was cooled to 25° C. and neutralized with aqueous sodium hydroxide solution (pH≈8).

The solids content of the resulting dispersions was about 49% by weight. The acid employed in each case and the glass transition temperature $T_g$ of the resulting copolymer are indicated in Table 1.

TABLE 1

| Dispersion | Acid S | % by wt.[1] | Tg[2] |
|---|---|---|---|
| CD1 | Na-AMPS[3] | 1.95 | 37.8 |
| CD2 | Methacrylic acid | 1.95 | 41.5 |
| CD3 | Acrylic acid | 1.95 | 40.9 |
| D1 | Itaconic acid | 1.95 | 32.3 |

[1]Of acid, based on the overall monomer amount
[2]Glass transition temperature (determined by DSC in accordance with DIN 53765)
[3]Sodium salt of 2-acrylamido-2-methylpropanesulfonic acid Emulsifier solution 1: 45% strength by weight aqueous solution of an active substance conventional commercially as Dowfax® 2A1 (Dow Chemical) (mixture of mono- and di-$C_1$–$C_{12}$-alkyl compound of the formula I as sodium salt).

Emulsifier solution 2: 15% strength by weight aqueous solution of the sodium salt of a $C_{12}$-alkyl sulfate Preparation Procedure b) (Dispersions CD4 to CD8, D2, D3)

A polymerization vessel was charged with 517 g of deionized water, 1.6 g of emulsifier solution 1 and 17.5 g of seed dispersion and this initial charge was heated to 85° C.

Furthermore, in a feed vessel 1 an emulsion was prepared from 567.0 g of deionized water
45.1 g of emulsifier solution 1
35.0 g of emulsifier solution 3
728.0 g of methyl methacrylate
672.0 g of n-butyl acrylate
x g of acid S (Table 2)
y g of a 50% strength aqueous solution of acrylamide (Table 2).

In a second feed vessel a solution was prepared of 4.2 g of sodium peroxodisulfate in 200 g of water.

Then, still at 85° C., 10.2 g of feed stream 2 were added in one portion to the polymerization vessel. Then, beginning concurrently and by way of spatially separate feed ports, the remainder of feed stream 1 was added over the course of 3 h and the remainder of feed stream 2 over the course of 3.5 h. After the end of feed stream 2 postpolymerization was allowed to take place for 1 h and then the batch was cooled to 25° C. and neutralized with ammonia (ph≈8). The dispersions had a solids content of approximately 51.5% by weight.

The seed used was a polystyrene dispersion with a solids content of 32% by weight (average particle size 29 nm; dodecylbenzenesulfonate as emulsifier).

Emulsifier solution 1: as in preparation procedure a)
Emulsifier solution 3: 20% strength by weight aqueous solution of a fatty alcohol ethoxylate ($C_{16}$–$C_{18}$-alkyl; average degree of ethoxylation 18)

The acid employed in each case, and the amount of acrylamide, are indicated in Table 2.

TABLE 2

| Dispersion | Acid S | x g | % by wt.[1] | y g of acrylamide | Tg [° C.] |
|---|---|---|---|---|---|
| CD4 | — | 0 | 0 | 28 | 22 |
| CD5 | Acrylic acid | 7 | 0.5 | 14 | 24 |
| CD6 | Acrylic acid | 14 | 1.0 | 14 | 24.5 |
| CD7 | Methacrylic acid | 7 | 0.5 | 14 | 24 |
| CD8 | Methacrylic acid | 14 | 1.0 | 14 | 26.5 |
| D2 | Itaconic acid | 7 | 0.5 | 14 | 24 |
| D3 | Itaconic acid | 14 | 1.0 | 14 | 24 |

[1]Of acid, based on the overall monomer amount

II. Determining the Performance Properties

1) To determine the water uptake, 100 g of each of dispersions CD1–CD3 and D1 were admixed with 0.5 g of a defoamer (Tego Foamex® 825 from Th. Goldschmidt AG) and 5 g of a technical-grade mixture of the di-n-butyl esters of succinic, glutaric and adipic acid. The resulting dispersions were used to cast films which were dried at room temperature for 3 days and at 60° C. for 24 h. The dry thickness of the films was 500±50 µm. The resulting films were weighed, stored in water for 24 h, freed from traces of adhering water and weighed again. Table 3 indicates the difference in weight between the dry and wet film in % by weight, based on the weight of the dry film.

TABLE 3

| Dispersion | Water uptake [% by wt.] |
|---|---|
| CD1 | 42.9 |
| CD2 | 28.1 |
| CD3 | 9.0 |
| D1 | 5.3 |

2) The water uptake for coatings formed from the dispersions CD4 to CD8, D2 and D3 was determined as follows: 100 g of each of the dispersions were admixed with 1.0 g of butyldiglycol, 2.0 g of Plastilit® 3060 from BASF AG and 0.5 g of defoamer (Tego Foamex® 825). The resulting dispersions were used to cast films, in the manner described above, under 1), having a dry thickness of 500±50 µm. The resulting films were stored in water for 72 h, freed from adhering water and then dried for 48 h at 60° C. to constant weight. The films were subsequently weighed, stored in water again for 48 h and, following the removal of traces of adhering water, were weighed again. Table 4 indicates the resulting weight increase in % by weight based on the weight of the dry film.

3) To determine the protection of shaped mineral articles against efflorescence, the formulated dispersions of II 2) were used in turn to formulate an emulsion paint. For this purpose 235.3 g of a customary commercial filler (calcium carbonate/calcium silicate) and 58.8 g of red iron oxide pigment from BAYER AG were suspended in 117.6 g of water. 588.3 g of the formulated dispersions from II 2) were added to this suspension with stirring. Prior to their performance testing, the resulting paints were allowed to age at room temperature for 48 h. The paint was then applied by spray gun to a green precast concrete product*) (add-on about 20 g/slab, corresponding to a wet coating weight of approximately 320 g/m²). The slab was subsequently dried for 2 h at 40° C. and 75% relative atmospheric humidity and then 4 h at 40° C. and 95% relative atmospheric humidity. It was then coated in the same way with a second coating (10 g/slab) which was dried for 8 h at 40° C. and 50% relative atmospheric humidity (referred to as dry application).

*) The green precast concrete product used was a flat slab measuring 30×20×1.8 cm and produced by extruding a mortar of sand (grain size up to 0.3 mm) and cement (sand:cement weight ratio 4:1) together with water (water:cement weight ratio 1:2.5).

After drying, the slab was placed for 7 d face down on a 60° C. water bath. The degree of efflorescence was assessed visually on the basis of the following scale of ratings. The results are compiled in Table 4.

0=no efflorescence
1=almost no efflorescence
2=slight efflorescence
3=moderate efflorescence
4=severe efflorescence
5=very severe efflorescence 4) To determine the color change of coated precast concrete products after exposure to weathering, green precast concrete products were coated in the manner described for II 3) with the paint described in II 2). The slab was then exposed for 7 d to a 60° C. water bath. After drying off, the difference in lightness between the weathered and the unweathered areas was assessed visually using a scale from 0 to 2. The results are compiled in Table 4.

0=no difference
1=slight difference
2=distinct difference

TABLE 4

| Dispersion | Water uptake [% by wt.] | Efflorescence | Difference in lightness |
|---|---|---|---|
| CD4 | 8.1 | 0 | 1 |
| CD5 | 5.9 | 1 | 1 |
| CD6 | 6.2 | 2 | 1 |
| CD7 | 7.1 | 0 | 0–1 |
| CD8 | 6.7 | 1 | 0–1 |
| D2 | 3.9 | 0 | 0 |
| D3 | 4.0 | 0 | 0 |

We claim:

1. A method of coating a shaped mineral article, which comprises applying an aqueous formulation comprising as a film-forming constituent at least one copolymer P, synthesized from ethylenically unsaturated monomers M, the copolymer P having a glass transition temperature $T_g$ in the range from −25 to +80° C. and the monomers M comprising 0.5 to 3% by weight, based on the overall weight of the monomers M, of itaconic acid as monomer M1, 95 to 99.5% by weight, based on the overall weight of the monomers M, of at least two further monomers M2 and M3, wherein M2 is methylmethacrlate and monomer M3 is n-butylacrylate, and 0 to 4.8% by weight, based on the overall weight of the monomers M, of at least one further monomer M4 selected from the group consisting of acrylamide and methacrylamide, provided that the total content of M1 and M4 does not exceed 5% by weight, to at least one of the surfaces of the shaped article and then drying it.

2. The method as claimed in claim 1, wherein the weight ratio of methylmethacrylate to n-butylacrylate is from 40:60 to 80:20.

3. The method as claimed in claim 1, wherein the aqueous formulation comprises, based on its overall weight, from 10 to 60% by weight of at least one copolymer P, and from 0.5 to 10% by weight of customary auxiliaries.

4. The method as claimed in claim 3, wherein the customary auxiliaries comprise at least one of film forming auxiliaries and defoamers.

5. The method as claimed in claim 3, wherein the aqueous formulation is applied as a clear coat.

6. The method as claimed in claim 1, wherein the shaped mineral article to be coated is selected from precast concrete products.

7. The method as claimed in claim 1, wherein the shaped mineral article to be coated is selected from concrete roof tiles and fiber-reinforced cement slabs.

8. The method as claimed in claim 1, wherein the total amount of monomers M2 and M3 is from 97 to 99.5% by weight, based on the overall weight of the monomers M, and the amount of monomer M4 is from 0 to 2.5% by weight, based on the overall weight of the monomers M, provided that the total content of M1 and M4 does not exceed 5% by weight.

9. The method as claimed in claim 1, wherein said aqueous formulation additionally contains an anionic surface-active compound of the following formula I:

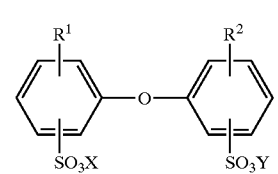

(I)

where $R^1$ and $R^2$ are hydrogen or $C_4$–$C_{24}$-alkyl but are not both hydrogen, and X and Y are alkali metal and/or ammonium ions.

* * * * *